(12) United States Patent
Heumann et al.

(10) Patent No.: US 9,958,296 B2
(45) Date of Patent: May 1, 2018

(54) INDUCTIVE POSITION-MEASURING DEVICE FOR ABSOLUTE POSITION DETERMINATION

(71) Applicant: DR. JOHANNES HEIDENHAIN GmbH, Traunreut (DE)

(72) Inventors: Martin Heumann, Traunstein (DE); Marc Oliver Tiemann, Waging am See (DE); Alexander Frank, Vachendorf (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 0 days. days.

(21) Appl. No.: 15/356,698

(22) Filed: Nov. 21, 2016

(65) Prior Publication Data

US 2017/0160102 A1    Jun. 8, 2017

(30) Foreign Application Priority Data

Dec. 8, 2015   (DE) .......................... 10 2015 224 589

(51) Int. Cl.
  *G01D 5/20*    (2006.01)
  *G01D 5/245*   (2006.01)
(52) U.S. Cl.
  CPC ......... *G01D 5/2013* (2013.01); *G01D 5/2053* (2013.01); *G01D 5/2452* (2013.01)
(58) Field of Classification Search
  CPC ... G01D 5/2013; G01D 5/2053; G01D 5/2452
  USPC ....................................... 324/207.17, 207.24
  See application file for complete search history.

(56) References Cited

U.S. PATENT DOCUMENTS 6,384,598 B1    5/2002   Hobein et al.
2013/0090890 A1*  4/2013   Meyer .................. G01D 5/2452
                                          702/150

FOREIGN PATENT DOCUMENTS

EP    1081454 B1    3/2001
EP    2581711 A2    4/2013
EP    2851655 A1    3/2015

* cited by examiner

*Primary Examiner* — Jay Patidar
(74) *Attorney, Agent, or Firm* — Leydig, Voit & Mayer, Ltd.

(57) ABSTRACT

An inductive position-measuring device for absolute position determination includes a scale having a first measuring graduation extending in a measurement direction and a second measuring graduation disposed opposite to the first measuring graduation and extending parallel thereto. A scanner is disposed in a gap between the first measuring graduation and the second measuring graduation. The scanner is displaceable relative to the scale in the measurement direction for purposes of position measurement. The scanner includes a first coil arrangement for scanning the first measuring graduation and generating a first position-dependent scanning signal, and a second coil arrangement, disposed opposite to the first coil arrangement, for scanning the second measuring graduation and generating a second position-dependent scanning signal. At least one intermediate layer of soft magnetic material disposed between the first coil arrangement and the second coil arrangement.

12 Claims, 4 Drawing Sheets

INDUCTIVE POSITION-MEASURING DEVICE FOR ABSOLUTE POSITION DETERMINATION

CROSS-REFERENCE TO PRIOR APPLICATION

Priority is claimed to German Patent Application No. DE 10 2015 224 589.6, filed on Dec. 8, 2015, the entire disclosure of which is hereby incorporated by reference herein.

FIELD

Inductive position-measuring devices are used for determining the position of two relatively movable components. They are used, for example, as rotary encoders to determine the angular position of two relatively rotatable machines parts or as length-measuring systems to directly measure longitudinal displacements along an axis.

Such inductive position-measuring devices find application as measuring devices for electric drives to determine relative movement or the relative position of corresponding machine parts. In this case, the generated position values are supplied via a suitable interface arrangement to subsequent electronics for controlling the drives. A distinction is made between incremental position-measuring devices and absolute position-measuring devices. There is an increasing demand for absolute position-measuring devices.

BACKGROUND

An absolute inductive position-measuring device of this type is known from EP 1081454 B1. The absolute position is obtained by inductive scanning of two measuring graduations having slightly different periodic measuring graduations (vernier principle), which each influence the strength of the inductive coupling between an excitation winding and a scanning winding as a function of position. The coil arrangements for scanning the two measuring graduations are disposed in the space or gap between the measuring graduations.

SUMMARY

In an embodiment, the present invention provides an inductive position-measuring device for absolute position determination. A scale has a first measuring graduation extending in a measurement direction and a second measuring graduation disposed opposite to the first measuring graduation and extending parallel thereto. A scanner is disposed in a gap between the first measuring graduation and the second measuring graduation. The scanner is displaceable relative to the scale in the measurement direction for purposes of position measurement. The scanner includes a first coil arrangement for scanning the first measuring graduation and generating a first position-dependent scanning signal, and a second coil arrangement, disposed opposite to the first coil arrangement, for scanning the second measuring graduation and generating a second position-dependent scanning signal. At least one intermediate layer of soft magnetic material disposed between the first coil arrangement and the second coil arrangement.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
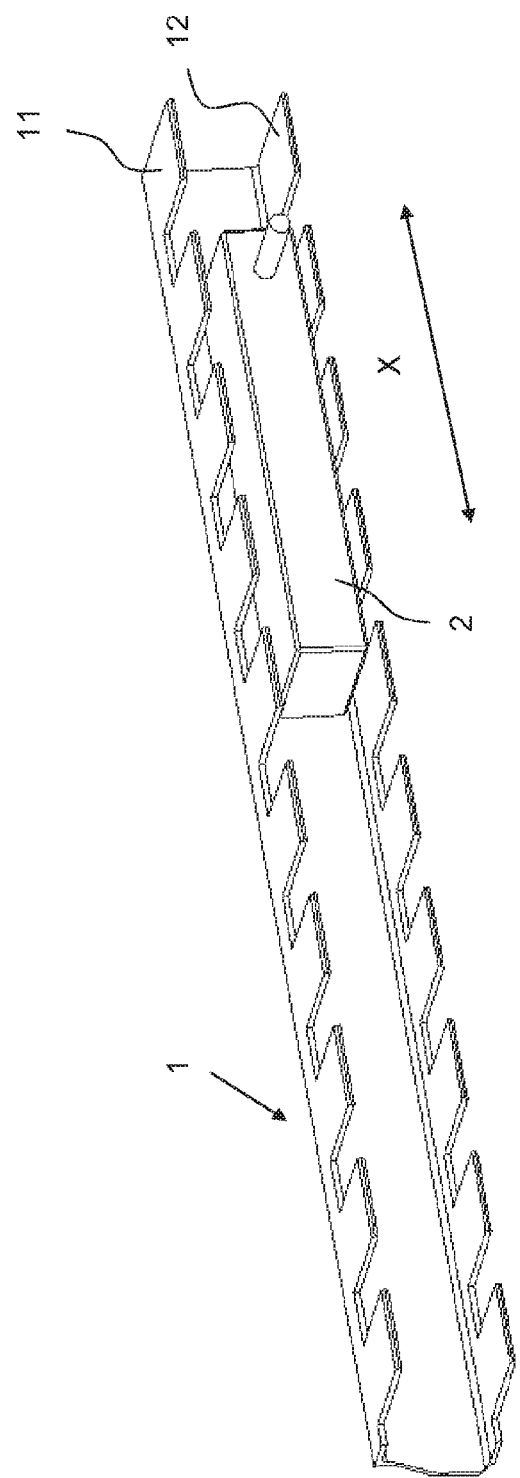
FIG. 1 is a perspective view of a first inductive position-measuring device according to an embodiment of the present invention.

In an embodiment, the present invention provides an inductive position-measuring device that is capable of determining a precise absolute position and is compact and rugged in construction.

According to an embodiment, the inductive position-measuring device includes:

a scale unit having a first measuring graduation extending in the measurement direction and a second measuring graduation disposed opposite the first measuring graduation and extending parallel thereto;

a scanning unit disposed in a gap between the first measuring graduation and the second measuring graduation and displaceable relative to the scale unit in the measurement direction for purposes of position measurement, the scanning unit including a first coil arrangement for scanning the first measuring graduation and generating a first position-dependent scanning signal and further including a second coil arrangement disposed opposite the first coil arrangement and used for scanning the second measuring graduation and generating a second position-dependent scanning signal, wherein at least one intermediate layer of soft magnetic material is disposed between the first coil arrangement and the second coil arrangement.

Soft magnetic materials are ferromagnetic materials that can be easily magnetized in a magnetic field. The magnetic polarization in the material increases an external magnetic field by the material's permeability. The soft magnetic material may be present in the form of a solid metal, as a bonded metal powder, in the form of ceramic materials called ferrites, or as plastic-bonded ferrite powder.

The soft magnetic material used as an intermediate layer has the function of guiding the field lines of the alternating magnetic field that originate from the first coil arrangement within the layer of the material of the intermediate layer and thereby forming a closed and spatially confined magnetic circuit, as well as the function of guiding the field lines of the alternating magnetic field that originate from the second coil arrangement within the layer of the material of the intermediate layer and thereby forming a closed and spatially confined magnetic circuit. Thus, the intermediate layer separates the field lines originating from the first coil arrangement from the field lines originating from the second coil arrangement.

A particularly suitable construction for the intermediate layer is a sandwich construction composed of a core having disposed on both sides thereof a layer of soft magnetic material which, in alternating fields in the range of about 2 MHz, has a high electrical resistance, for example in the range of $1 \times 10^6 \Omega$, and thus is virtually electrically non-conductive. One such material is flux field directional material (FFDM) and is commercially available in sheet form as "sintered ferrite sheet." Due to the poor electrical conductivity, no eddy currents can form in this material, which would attenuate the excitation field of the respective coil arrangement.

The core is preferably also composed of a soft magnetic material. In particular, the permeability of the core material is significantly, preferably many times, higher than that of the layers disposed on both sides thereof. In this case, the core absorbs the interfering flux originating from an external magnetic field, and the layers do not go into saturation. This is because if the position-measuring device is exposed to an external magnetic field, this external magnetic field must be prevented from saturating the functional layers, because otherwise the flux-increasing effect would no longer be present. A particularly suitable material for the core is soft magnetic steel.

The metallic intermediate layer may also be mu-metal; i.e., a metal having a very high permeability of over 10,000. This soft magnetic material has good electrical conductivity, and because of the extremely high permeability in alternating fields in the range of 2 MHz, the penetration depth of the alternating fields is very small, and the alternating fields extend only to depths of a few μm, so that the effective electrical resistance is very high and, therefore, no or only negligible eddy currents are formed, which could counteract and attenuate the excitation field of the respective coil arrangement.

A first exemplary embodiment of the present invention will be described in detail with reference to FIGS. 1 through 4. FIG. 1 shows a scale unit 1 having two measuring graduations 11 and 12 extending in measurement direction X, the two measuring graduations being disposed opposite each other and forming a gap therebetween. First measuring graduation 11 has graduation elements having a first graduation period P1, and second measuring graduation 12 has graduation elements having a second graduation period P2. The periodically arranged graduation elements of the two measuring graduations 11, 12 are scannable inductively. To this end, measuring graduations 11, 12 are each composed of a periodic sequence of electrically conductive graduation elements spaced apart from one another in measurement direction X. In the exemplary embodiment shown, these graduation elements are flat rectangles. However, the graduation elements may also have other shapes, such as a curved outer contour or a triangular shape. The graduation elements constitute inductive coupling elements which modulate the strength of the inductive coupling between an excitation winding 210, 220 and a scanning winding 211, 212, 221, 222 as a function of position by means of eddy currents forming in a graduation element and counteracting the excitation field. FIG. 4 schematically shows the eddy currents forming in the graduation elements of measuring graduation 11.

Graduation period P1 of first measuring graduation 11 and graduation period P2 of second measuring graduation 12 differ only slightly, so that an absolute position AP can be derived therefrom over several such graduation periods P1, P2. Thus, the absolute position measurement is based on the vernier principle.

The inductive position-measuring device further includes a scanning unit 2 for scanning the two measuring graduations 11 and 12 of scale unit 1, the scanning unit being disposed in the gap between first measuring graduation 11 and second measuring graduation 12. For purposes of position measurement, scanning unit 2 is movable relative to scale unit 1 in measurement direction X. Scanning unit 2 includes a first coil arrangement 21 for scanning first measuring graduation 11 and generating at least one first position-dependent scanning signal S1. Scanning unit 2 includes a second coil arrangement 22 for scanning second measuring graduation 12 and generating at least one second position-dependent scanning signal S2.

First coil arrangement 21 has a first excitation winding 210 and a plurality of first mutually phase-shifted periodic scanning windings 211, 212. Similarly, for purposes of scanning second measuring graduation 12, second coil arrangement 22 has a second excitation winding 220 and a plurality of second mutually phase-shifted periodic scanning windings 221, 222. First scanning windings 211, 212 each include a plurality of periodic windings arranged along measurement direction X for simultaneous scanning of a plurality of graduation elements of first measuring graduation 11, which are arranged along measurement direction X, and for generating a plurality of mutually phase-shifted first scanning signals S1, S11 having the signal period P1. Second scanning windings 221, 222 each include a plurality of periodic windings arranged along measurement direction X for simultaneous scanning of a plurality of graduation elements of second measuring graduation 12, which are arranged along measurement direction X, and for generating a plurality of mutually phase-shifted second scanning signals S2, S21 having the signal period P2.

Figure 3:
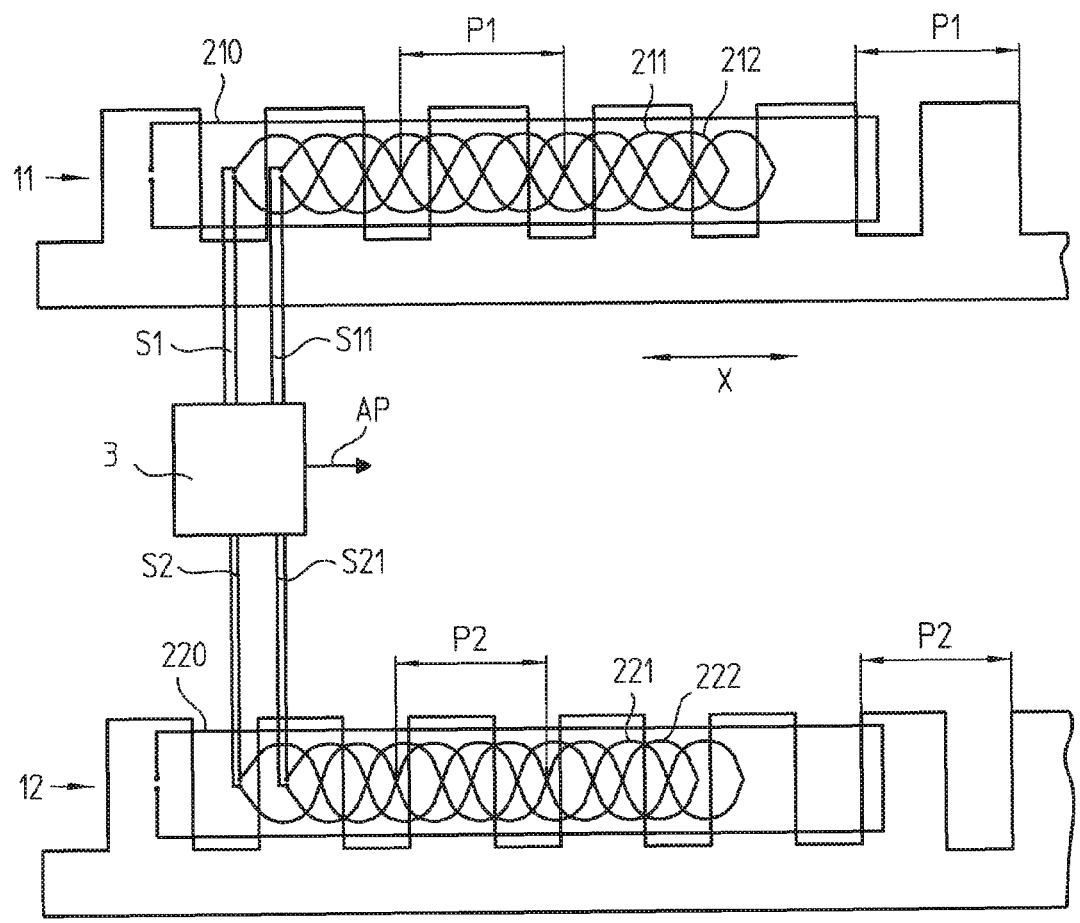
FIG. 3 is a view illustrating in detail the configuration and the scanning of the first and second measuring graduations.
Figure 4:
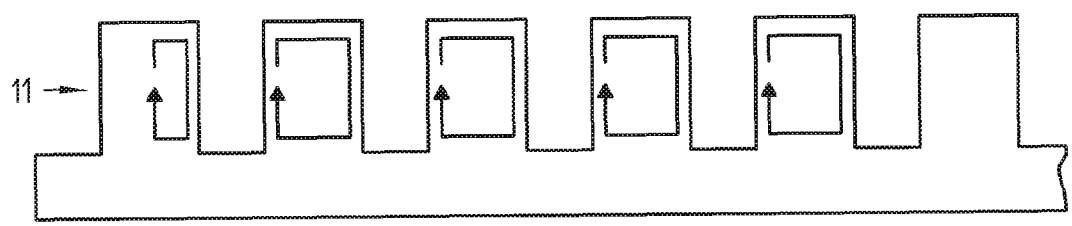
FIG. 4 is a view showing the eddy currents forming in the first measuring graduation.

Scanning unit 2 is shown schematically in FIG. 3 to illustrate in more detail how inductive scanning is performed through interaction with scale unit 1.

Planar excitation winding 210 is energized with an excitation current such that a time-changing electromagnetic excitation field is generated in the region of the graduation elements of first measuring graduation 11. This excitation current has a frequency of 100 kHz to 10 MHz. Excitation winding 210 is spatially arranged so as to generate as homogeneous an electromagnetic field as possible in the sequence of graduation elements of first measuring graduation 11 located opposite.

Scanning windings 211, 212 are disposed within excitation winding 210. The excitation field generated by excitation winding 210 produces eddy currents in the graduation elements, the eddy currents counteracting the excitation field as an opposing field. The excitation field associated with scanning windings 211, 212 induces a voltage therein which is dependent on the relative position with respect to the electrically conductive graduation elements. Thus, excitation winding 210 is inductively coupled to scanning windings 211, 212 as a function of the relative position of the graduation elements with respect thereto in measurement direction X. The alternating electromagnetic field is modulated by the graduation elements as a function of position in measurement direction X. As a result, the voltage induced in scanning windings 211, 212 also varies as a function of position. The voltage induced in the respective scanning windings 211, 212 is supplied in the form of scanning signals S1, S11 to an evaluation unit 3.

Planar excitation winding 220 is also energized with an excitation current such that a time-changing electromagnetic excitation field is generated in the region of the graduation elements of second measuring graduation 12. This excitation current has a frequency of several MHz. Excitation winding 220 is spatially arranged so as to generate as homogeneous an electromagnetic field as possible in the sequence of graduation elements located opposite.

Scanning windings 221, 222 are disposed within excitation winding 220. The excitation field generated by excitation winding 220 produces eddy currents in the graduation elements, the eddy currents counteracting the excitation field as an opposing field. The excitation field associated with scanning windings 221, 222 induces a voltage therein which is dependent on the relative position with respect to the electrically conductive graduation elements. Thus, excitation winding 220 is inductively coupled to scanning windings 221, 222 as a function of the relative position of the graduation elements with respect thereto in measurement direction X. The alternating electromagnetic field is modulated by the graduation elements as a function of position in measurement direction X. As a result, the voltage induced in scanning windings 221, 222 also varies as a function of position. The voltage induced in the respective scanning windings 221, 222 is supplied in the form of scanning signals S2, S21 to an evaluation unit 3.

Scanning signals S1, S11, S2, S21 are applied to evaluation unit 3 of scanning unit 2, which is configured to generate in a known manner, through comparison of the phase angles, a beat signal indicative of the unique absolute position AP of scanning unit 2 relative to scale unit 1. The measurement range to be absolutely coded is dependent in a known manner on the selected difference between the two graduation periods P1, P2. It is particularly advantageous if the number of graduation periods P1 and the number of graduation periods P2 over the entire measurement range to be absolutely coded differ by one. Absolute position AP is provided as a digital data word, preferably in serial form, at the output of scanning unit 2.

Figure 2:
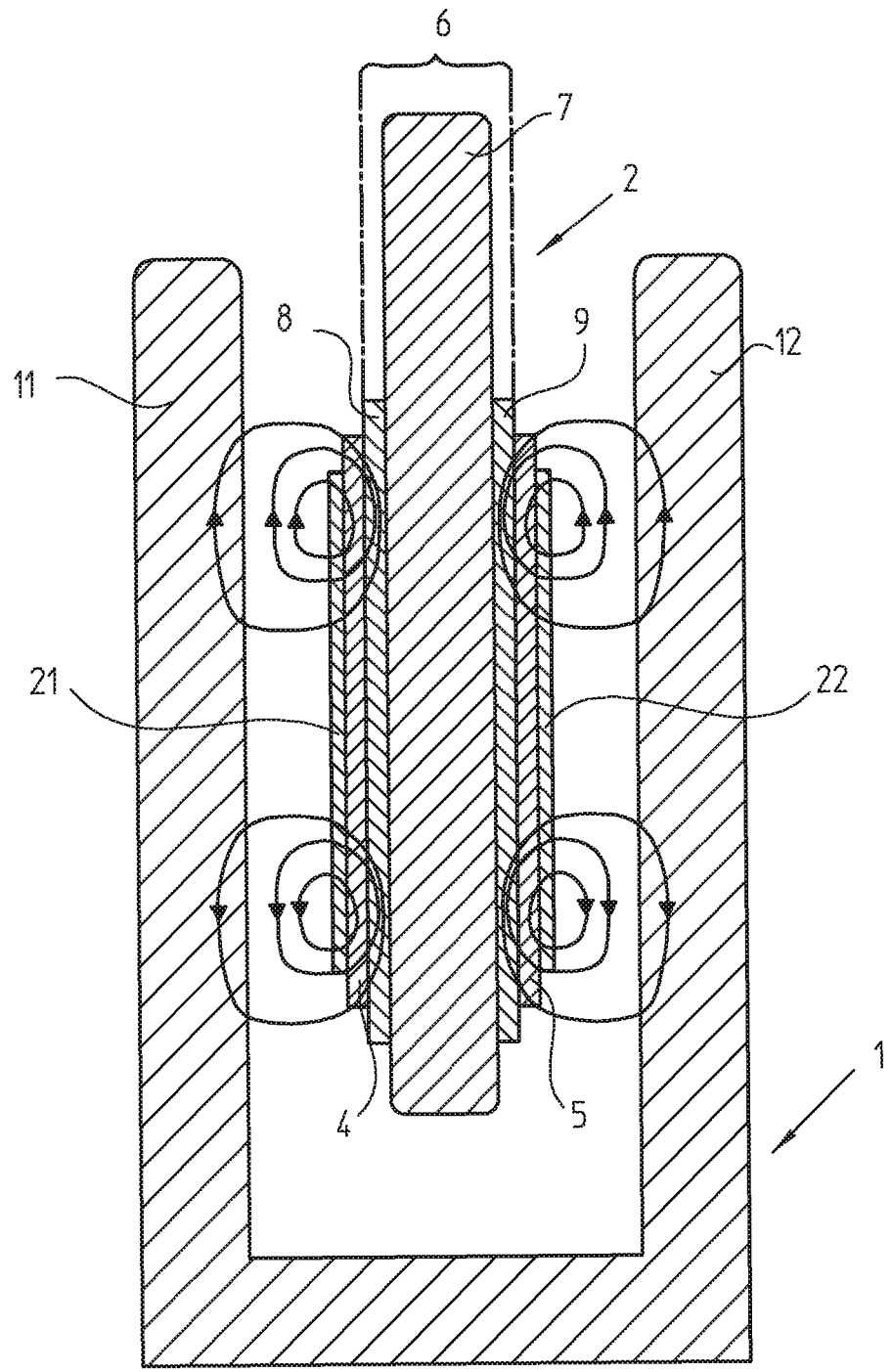
FIG. 2 is a cross-sectional view of the inductive position-measuring device of FIG. 1.

The construction of scanning unit 2 is described in more detail with reference to the cross-sectional view of FIG. 2. First coil arrangement 21, including excitation winding 210 and scanning windings 211, 212, is disposed on a first circuit board 4 at a small scanning distance from first measuring graduation 11. Second coil arrangement 22, including excitation winding 220 and scanning windings 221, 222, is disposed on a second circuit board 5 at a small scanning distance from second measuring graduation 12. An intermediate layer 6 of soft magnetic material is disposed between first coil arrangement 21 and second coil arrangement 22.

The soft magnetic material used as an intermediate layer 6 has the function of guiding the field lines of the alternating magnetic field that originate from first coil arrangement 21 within a layer of the material of intermediate layer 6 and thereby forming a closed and spatially confined magnetic circuit, as well as the function of guiding the field lines of the alternating magnetic field that originate from second coil arrangement 22 within a layer of the material of intermediate layer 6 and thereby forming a closed and spatially confined magnetic circuit. Thus, intermediate layer 6 separates the field lines originating from first coil arrangement 21 from the field lines originating from second coil arrangement 22.

In the first exemplary embodiment, the intermediate layer is composed of a soft magnetic core 7 that is provided on both sides with a layer 8, 9 of an electrically non-conductive soft magnetic material. Due to the poor electrical conductivity in alternating magnetic fields at a frequency of several MHz (approximately 2 MHz), no eddy currents can form in layers 8, 9, which would attenuate the excitation field of the respective coil arrangement 21, 22. Due to the relatively high permeability (much greater than one) of layers 8, 9, the excitation field is guided in layers 8, 9 and thereby increased. This prevents an excessive amount of magnetic flux reaching core 7, so that no eddy currents can form there, which could attenuate the excitation field. Layers 8, 9 preferably have a thickness of 100 μm to 1000 μm each. Advantageously, core 7 is composed of a soft magnetic, electrically conductive metal. A particularly suitable material for the core is soft magnetic steel. Core 7 has a thickness of few mm.

The permeability of core 7 is preferably greater than that of the two layers 8, 9. In this manner, it is achieved that the flux density in core 7 is greater than in layers 8, 9. Therefore, external magnetic fields (interference fields) propagate, for the most part, in core 7, and layers 8, 9 do not go into saturation so easily. The permeability of core 7 is in particular many times greater than that of the layers 8, 9. If the permeability of the core is in the range of 300, then the permeability of the layers should be in the range of 100 or less at frequencies of 100 kHz to 10 MHz.

A particularly suitable matrix material for layers 8, 9 is electrically non-conductive matrix material having soft magnetic particles embedded therein. Therefore, layers 8, 9 may be formed of a film of flux field directional material. One suitable matrix material is plastic, particularly epoxy resin, having the soft magnetic particles in powder form mixed therein.

Centrally disposed core 7, layers 8, 9 disposed on both sides thereof, circuit boards 4, 5 attached thereto, and planar coil arrangements 21, 22 disposed thereon form a sandwich-like stack, providing a compact construction which, in addition, is mechanically stable because of the metallic core 7.

Layers 8, 9 and circuit boards 4, 5 may also be manufactured together in the form of prepregs containing fibers, matrix material and soft magnetic particles. Core 7, layers 8, 9 and circuit boards 4, 5 may form a multilayer construction, the individual layers being pressed together under the action of heat. This provides a rigid and compact sandwich-like construction.

Figure 5:
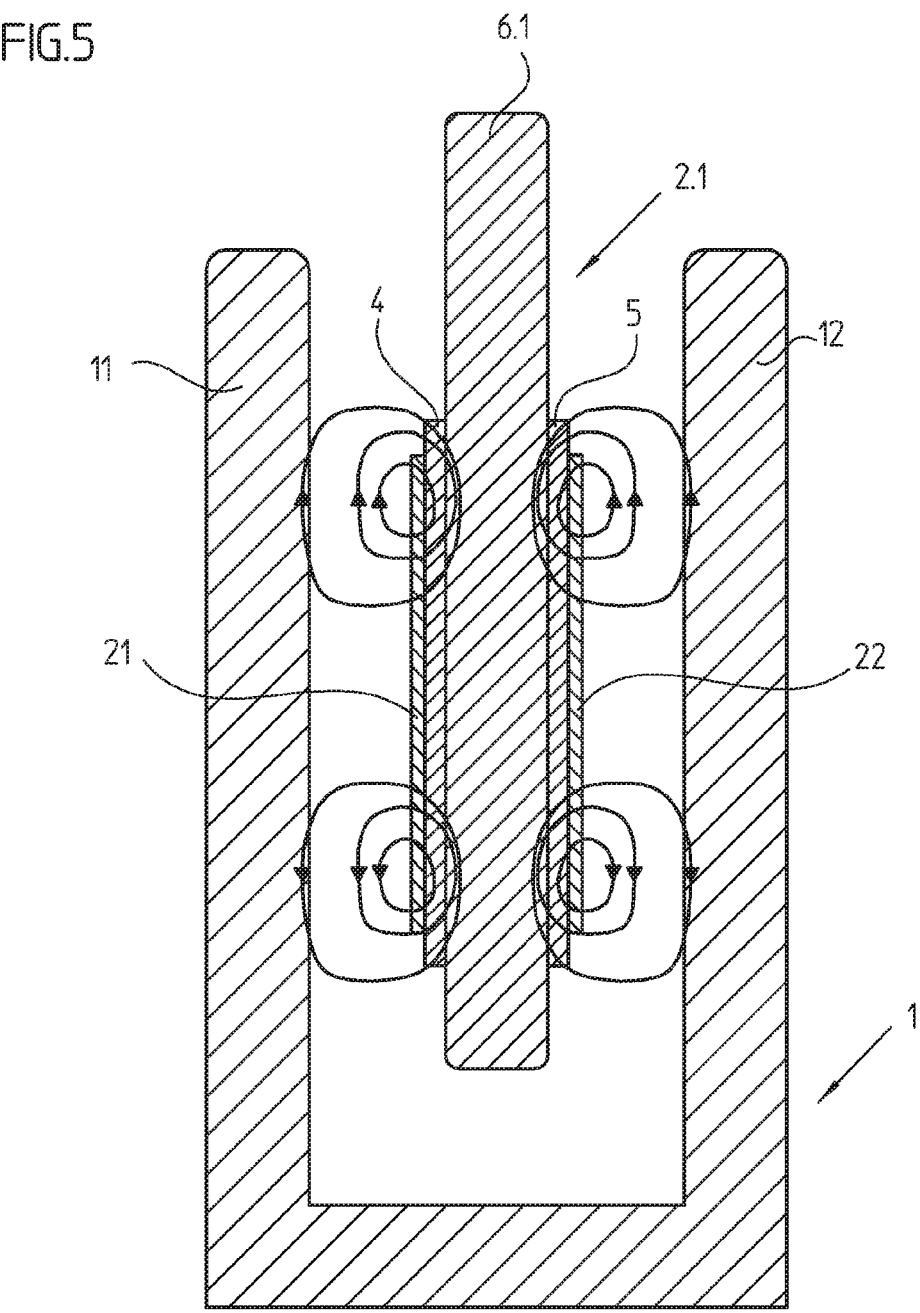
FIG. 5 is a cross-sectional view of a second inductive position-measuring device according to another embodiment the present invention.

FIG. 5 shows an alternative construction of a scanning unit 2.1. In this case, soft magnetic intermediate layer 6.1 is composed of a mu-metal. In this exemplary embodiment, layers 8, 9 are not absolutely necessary, so that circuit boards 4, 5, including coil arrangements 21, 22, may be attached directly to the mu-metal. Intermediate layer 6.1 in the form of a mu-metal has good electrical conductivity, but because of the extremely high permeability in alternating fields in the range of 2 MHz, the penetration depth of the alternating fields is very small, and the alternating fields extend only to depths of a few μm, so that the effective electrical resistance is very high and, therefore, no or only negligible eddy currents are formed, which could counteract and attenuate the excitation field of the respective coil arrangement.

In the exemplary embodiments above, scale unit 1 is formed of a U-section member having measuring graduations 11, 12 formed in or on the two parallel legs thereof. First measuring graduation 11 is formed in one of the two legs and second measuring graduation 12 is formed in the other leg of the U-section member, which extends opposite and parallel to first measuring graduation 11. Scale unit 1, as it were, embraces scanning unit 2 or 2.1, respectively.

In the exemplary embodiment, the graduation elements constitute inductive coupling elements which modulate the strength of the inductive coupling between excitation winding 210, 220 and scanning winding 211, 212, 221, 222 as a function of position by means of eddy currents forming in respective graduation elements and counteracting the excitation field. In this case, a particularly suitable material for scale unit 1 is a non-magnetic material having good electrical conductivity, such as aluminum.

FIG. 1 shows a particularly advantageous embodiment of scale unit 1 in the form of a U-section member, where first measuring graduation 11 and second measuring graduation 12 are each composed of a sequence of teeth and tooth spaces. Particularly high flexural stiffness is obtained for scale unit 1 when the tooth spaces do not reach to the base of the U-section member; i.e., when continuous webs extending in measurement direction X remain at both sides adjacent the base of the U-section member.

The embodiment of scale unit 1 as a U-section member has the advantage that scale unit 1 is formed as a single piece and that measuring graduations 11, 12 can be formed therein such that they are aligned with one another with the required accuracy. First measuring graduation 11 and second measuring graduation 12 may be formed in a strip of sheet metal by punching or by laser or water jet cutting, whereupon the sheet metal strip is shaped into the U-section member. The U-section member, especially when used as a linear scale unit 1, has the advantage of having high flexural stiffness and being self-supporting, and therefore provides a scale unit 1 that can be readily handled.

Figure 6:
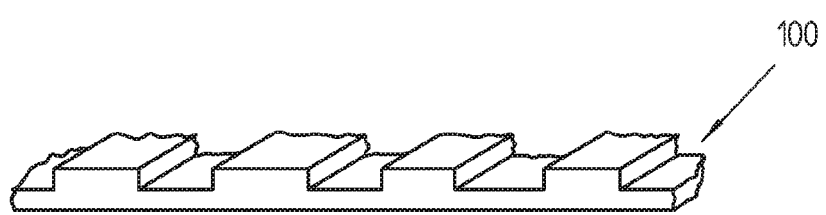
FIG. 6 is a view of an alternative embodiment of the scale unit.

Alternatively, the graduation elements of scale unit 100 may also be configured as shown in FIG. 6. In this case, the tooth spaces are each replaced by a region of weakened material and the graduation elements are configured as elevations facing the scanning unit 2. This alternative embodiment may also be provided in the two opposing legs of a U-section member, thereby achieving a construction that has particularly high flexural stiffness.

In the above-described exemplary embodiments using the vernier principle, graduation period P1 of first measuring graduation 11 matches the graduation period P1 of the associated scanning windings 211, 212, and the graduation period P2 of second measuring graduation 12 matches the graduation period P2 of the associated scanning windings 221, 222, with P1 and P2 slightly differing from one another. When using the vernier principle, the graduation period of the scanning windings for scanning first measuring graduation 11 and the graduation period of the scanning windings for scanning second measuring graduation 12 may alternatively also be identical, as described in EP 2 851 655 A1.

In the exemplary embodiments described above, the graduation elements constitute inductive coupling elements which modulate the strength of the inductive coupling between excitation winding 210, 220 and scanning winding 211, 212, 221, 222 as a function of position by means of eddy currents forming in respective graduation elements and counteracting the excitation field, thus attenuating the flux. However, the scale unit may also be designed such that the graduation elements have a flux-increasing effect. In this case, the scale unit may be made of plastic filled with soft magnetic material or ferrite, for example in powder form. The scale unit may be then formed as an injection-molded part.

The first measuring graduation of the scale unit may be a chain code. As is generally known, the chain code includes a sequence of bits, of which several successive bit in the measurement direction are scanned simultaneously, forming a code word that uniquely determines the absolute position and provides a coarse absolute position. In this case, the second measuring graduation may be a periodic incremental graduation that further divides the absolute position measured by the chain code through interpolation, providing a fine position. The evaluation unit combines the coarse absolute position of the chain code and the fine position of the incremental graduation into a resulting absolute position.

Alternatively, a measuring graduation may also include a plurality of tracks, each having a periodic incremental graduation.

The scale unit may also have a plurality of scanning units associated therewith for purposes of position measurement. This may provide for redundant position measurement or ensure continuous position measurement across a junction when scanning a plurality of successive abutting scale units, with a switchover from one scanning unit to another scanning unit taking place at the junction.

With embodiments of the present invention, the whole position-measuring device can have a thickness of only a few mm. The construction is mechanically particularly stable and substantially immune to interference. Absolute position measurement is possible within a minimum of space.

The inventive position-measuring device is suitable in particular for use in transport systems and in automation technology in conjunction with linear drives.

The inductive position-measuring device of the present invention may be configured according to an embodiment as a length-measuring device or an angle-measuring device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An inductive position-measuring device for absolute position determination, comprising:
   a scale having a first measuring graduation extending in a measurement direction and a second measuring graduation disposed opposite to the first measuring graduation and extending parallel thereto;
   a scanner disposed in a gap between the first measuring graduation and the second measuring graduation, the scanner being displaceable relative to the scale in the measurement direction for purposes of position measurement, the scanner including a first coil arrangement for scanning the first measuring graduation and generating a first position-dependent scanning signal, and a second coil arrangement, disposed opposite to the first coil arrangement, for scanning the second measuring graduation and generating a second position-dependent scanning signal; and at least one intermediate ply of soft magnetic material disposed between the first coil arrangement and the second coil arrangement.

2. The inductive position-measuring device as recited in claim 1, wherein the at least one intermediate ply is composed of a soft magnetic core having electrically non-conductive soft magnetic layers disposed on both sides of the core.

3. The inductive position-measuring device as recited in claim 2, wherein the core is composed of a soft magnetic, electrically conductive metal.

4. The inductive position-measuring device as recited in claim 2, wherein the permeability of the core is greater than that of the layers.

5. The inductive position-measuring device as recited in claim 2, wherein each layer includes an electrically non-conductive matrix material having soft magnetic particles embedded therein.

6. The inductive position-measuring device as recited in claim 2, wherein the core is made of steel and the layers are each a film of flux field directional material.

7. The inductive position-measuring device as recited in claim 1, wherein the at least one intermediate layer ply includes a mu-metal.

8. The inductive position-measuring device as recited in claim 1, wherein the first measuring graduation is a periodic incremental graduation having a first graduation period and the second measuring graduation is a periodic incremental graduation having a second graduation period that differs from the first graduation period, and wherein the absolute position measurement is based on the vernier principle.

9. The inductive position-measuring device as recited in claim 8, wherein the first coil arrangement and the second coil arrangement each include an excitation winding and a plurality of mutually phase-shifted periodic scanning windings for simultaneous scanning of a plurality of graduation periods of the respective measuring graduations associated therewith.

10. The inductive position-measuring device as recited in claim 1, wherein the scanner includes an evaluator configured to generate, from the first position-dependent scanning signal and the second position-dependent scanning signal, a resulting absolute position, and to make the absolute position available as a digital data word at the output.

11. The inductive position-measuring device as recited in claim 1, wherein the scale is a U-section member with two parallel legs, and the first measuring graduation and the second measuring graduation are formed opposite to one another on the two parallel legs of the U-section member.

12. The inductive position-measuring device as recited in claim 11, wherein the first measuring graduation and the second measuring graduation are composed of a sequence of teeth and tooth spaces in the legs of the U-section member.

* * * * *